(12) United States Patent
Wilkinson

(10) Patent No.: US 10,572,165 B2
(45) Date of Patent: *Feb. 25, 2020

(54) PREDICTIVE POINT-IN-TIME COPY FOR STORAGE SYSTEMS

(71) Applicant: International Business Machines Corporation, Armonk, NY (US)

(72) Inventor: John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/808,620

(22) Filed: Nov. 9, 2017

(65) Prior Publication Data

US 2018/0067668 A1 Mar. 8, 2018

Related U.S. Application Data

(63) Continuation of application No. 14/650,855, filed as application No. PCT/IB2013/054831 on Jun. 13, 2013, now Pat. No. 9,857,996.

(30) Foreign Application Priority Data

Dec. 18, 2012 (GB) .................................. 12222777.3

(51) Int. Cl.
*G06F 3/06* (2006.01)
*G06F 11/14* (2006.01)
*G06F 11/20* (2006.01)

(52) U.S. Cl.
CPC ............ *G06F 3/0619* (2013.01); *G06F 3/061* (2013.01); *G06F 3/065* (2013.01); *G06F 3/067* (2013.01);

(Continued)

(58) Field of Classification Search
CPC ......................... G06F 11/1446; G06F 11/2056
See application file for complete search history.

(56) References Cited

U.S. PATENT DOCUMENTS 7,617,373 B2  11/2009  Kalos et al.
7,627,727 B1  12/2009  Kekre et al.
(Continued)

FOREIGN PATENT DOCUMENTS

CN    101079007 A    11/2007
WO    2014096986     6/2014

OTHER PUBLICATIONS

International Search Report and Written Opinion from PCT Application No. PCT/IB2013/054831, dated Dec. 5, 2013, 15 pgs.

(Continued)

*Primary Examiner* — Charles Rones
*Assistant Examiner* — Tian-Pong Chang
(74) *Attorney, Agent, or Firm* — Peter J. Edwards

(57) ABSTRACT

Method and system are provided for predictive point-in-time copy for storage systems. The method may include: recording a frequency of writes to an area of a storage volume; and prioritising areas for having point-in-time copies carried out based on the write frequency to an area, wherein areas in the storage volume having a high write frequency are prioritised before areas with a lower write frequency. An area may be of a coarser granularity than a region tracked for the point-in-time copy. The method may include: recording the frequency of writes to an area in a given period; and prioritising areas by their frequency of writes in the given period immediately prior to the point-in-time copy.

16 Claims, 5 Drawing Sheets

(52) U.S. Cl.
CPC ........ *G06F 3/0683* (2013.01); *G06F 11/1446* (2013.01); *G06F 11/2056* (2013.01)

(56) References Cited

U.S. PATENT DOCUMENTS

| | | | |
|---|---|---|---|
| 7,809,691 | B1 | 10/2010 | Karmarkar et al. |
| 7,865,473 | B2 | 1/2011 | Augenstein et al. |
| 8,046,551 | B1 | 10/2011 | Sahin |
| 8,108,640 | B1 | 1/2012 | Holl, II |
| 8,200,631 | B2 | 6/2012 | Wayda |
| 8,788,746 | B2 | 7/2014 | Matsushima et al. |
| 2004/0181642 | A1 | 9/2004 | Watanabe et al. |
| 2005/0033930 | A1 | 2/2005 | Haruma et al. |
| 2005/0251634 | A1 | 11/2005 | Burton et al. |
| 2006/0075200 | A1* | 4/2006 | Satoyama ........... G06F 11/1435 711/162 |
| 2007/0101072 | A1 | 5/2007 | Jackson |
| 2007/0277015 | A1 | 11/2007 | Kalos et al. |
| 2008/0288742 | A1 | 11/2008 | Hepkin et al. |
| 2010/0030956 | A1 | 2/2010 | La Frese et al. |
| 2010/0088282 | A1* | 4/2010 | Yamada ................ G06F 3/0608 707/649 |
| 2010/0274983 | A1 | 10/2010 | Murphy et al. |
| 2011/0173404 | A1 | 7/2011 | Eastman et al. |
| 2011/0271067 | A1* | 11/2011 | Chou .................. G06F 11/1448 711/162 |
| 2011/0283075 | A1 | 11/2011 | Jess et al. |
| 2011/0289059 | A1 | 11/2011 | Harris, Jr. et al. |
| 2012/0089795 | A1 | 4/2012 | Benhase et al. |
| 2012/0124306 | A1 | 5/2012 | Abercrombie et al. |
| 2012/0260051 | A1* | 10/2012 | Maki ..................... G06F 3/0611 711/162 |
| 2013/0007389 | A1* | 1/2013 | Patterson ................ G06F 3/061 711/162 |
| 2013/0262923 | A1* | 10/2013 | Benson ............... H04L 67/1097 714/15 |
| 2015/0309745 | A1 | 6/2015 | Wilkinson |

OTHER PUBLICATIONS

International Preliminary Report on Patentability from PCT Application No. PCT/182013/054831, dated Jun. 23, 2015, 8 pgs.

Anonymous, "Performance optimisations in Cascaded FlashCopy Systems", ip.com, An IP.com Prior Art Database Technical Disclosure, 2 pages. IP.com No. 000199838.

IBM, "Incremental FlashCopy", ip.com, An IP.com Prior Art Database Technical Disclosure, Original Publication Date: Mar. 18, 2005, 2 pages. IP.com No. 000103692.

* cited by examiner

PREDICTIVE POINT-IN-TIME COPY FOR STORAGE SYSTEMS

FIELD OF INVENTION

This invention relates to the field of storage systems. In particular, the invention relates to predictive point-in-time copy for storage systems.

BACKGROUND OF INVENTION

Point-in-time copy is used in storage systems to create a second copy of data to be used independently. This may also be referred to as a snapshot copy. Point-in-time copy may be generated by copy-on-write or redirect-on-write methods.

In storage systems that have a point-in-time copy feature using copy-on-write or redirect-on-write, there will be a means of tracking the location, typically a bitmap with a granularity such that one bit represents more than one physical storage allocation block.

Some costly processing is generally required on the first write to each region represented by a bit, with each processing action performed serially reading the region.

For copy-on-write solutions, the processing actions include: writing the read data to the copy target volume, merging the data written to the storage system with a second copy of the read data, and writing the merged data to the copy source volume.

For redirect-on-write solutions, the processing actions include: merging the read data with the data written to the storage system, and writing the merged data to the copy redirection volume.

In both cases, the write operation is then completed by writing the merged data to the host system that submitted it to the storage system.

These actions are slow, and significantly increase the load on the physical storage. A cache between the host system submitting the writes and the point-in-time copy feature can minimise the increase of write latency visible to the host system, but the increase in load on the physical storage will still be present.

This will typically halve the number of operations per second that the physical storage would normally support until a significant proportion of the regions have been written to. This in turn implies that in an environment where point-in-time copies are regularly triggered for a given volume, the user would have to specify double the amount of storage devices they would otherwise specify to provide the required performance. The number of operations supported in a RAID volume or aggregation of RAID volumes is typically proportional to the number of hard disk devices that the data is spread over.

Therefore, there is a need in the art to address the aforementioned problems.

BRIEF SUMMARY OF THE INVENTION

According to a first aspect of the present invention there is provided a method for predictive point-in-time copy for storage systems, comprising: recording a frequency of writes to an area of a storage volume; and prioritising areas for having point-in-time copies carried out based on the write frequency to an area, wherein areas in the storage volume having a high write frequency are prioritised before areas with a lower write frequency.

The area may be the same or of a coarser granularity than a region tracked for the point-in-time copy.

In one embodiment, the method may include: recording the frequency of writes to an area in a given period; and prioritising areas by their frequency of writes in the given period immediately prior to the point-in-time copy.

In another embodiment, the method may include: recording the frequency of writes to an area as a rolling count of writes; and prioritising areas by a rolling ranking of writes at a given time of a point-in-time copy.

The method may include running a point-in-time copy when the write rate is below an average write rate.

Prioritising areas may include: determining a time of a previous point-in-time copy for the volume; and weighting recordings of writes which occur nearest to the time of the previous point-in-time copy. The method may include defining time segments from the time of the previous point-in-time copy and weighting writes according to the segment in which they take place.

The method may further include: initially synchronising a point-in-time copy for a volume and only copying newly-written regions of a volume in subsequent point-in-time copies; and prioritising partial writes to an area.

Recording a frequency of writes to an area of a storage volume may include: intercepting input and outputs of a host server.

The method may include intelligently varying a background copy rate to increase the rate during periods of fewer writes.

According to a second aspect of the present invention there is provided a system for predictive point-in-time copy for storage systems, comprising: an area use recorder for recording a frequency of writes to an area of a storage volume; and an area ordering component for prioritising areas for having point-in-time copies carried out based on the write frequency to an area, wherein areas in the storage volume having a high write frequency are prioritised before areas with a lower write frequency.

In one embodiment, the area use recorder may be for: recording the frequency of writes to an area in a given period; and prioritising areas by their frequency of writes in the given period immediately prior to the point-in-time copy.

In another embodiment, the area use recorder may be for: recording the frequency of writes to an area as a rolling count of writes; prioritising areas by a rolling ranking of writes at a given time of a point-in-time copy.

The system may include a background copy control component for running a point-in-time copy when the write rate is below an average write rate.

The area ordering component may be for: determining a time of a previous point-in-time copy for the volume; and weighting recordings of writes which occur nearest to the time of the previous point-in-time copy. The area ordering component may be for: defining time segments from the time of the previous point-in-time copy and weighting writes according to the segment in which they take place.

The area use recorder may be for: initially synchronising a point-in-time copy for a volume and only copying newly-written regions of a volume in subsequent point-in-time copies; and prioritising partial writes to an area.

A background copy control component may be for intelligently varying a background copy rate to increase the rate during periods of fewer writes.

According to a third aspect of the present invention there is provided a computer program product for predictive point-in-time copy for storage systems, the computer program product comprising: a computer readable storage medium readable by a processing circuit and storing instructions for execution by the processing circuit for performing a method according to the first aspect.

According to a fourth aspect of the present invention there is provided a computer program stored on a computer readable medium and loadable into the internal memory of a digital computer, comprising software code portions, when said program is run on a computer, for performing the method of the first aspect.

According to a fifth aspect of the present invention there is provided a method substantially as described with reference to the figures.

According to a sixth aspect of the present invention there is provided a system substantially as described with reference to the figures.

The described aspects of the invention provide the advantage of minimising the performance impact of copy-on-write or redirect-on-write actions.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In storage systems, a disk may be apparently instantaneously copied using a copy-on-write or redirect-on-write method. Such methods give a detrimental impact to write latency the first time each disk region is modified after the copy is taken as the region's data is actually copied.

Some storage systems may lessen the impact by copying regions sequentially after the copy is taken, where any region that has already been so copied before the first time it is modified after the copy is taken shows no detrimental impact to write latency on modification. The described method further improves this by recording historical frequency of modification by region, and prioritising copying regions that are statistically likely to be modified first. The described method also describes an optional higher weighting for regions historically modified soon after copies are started.

Method and system are provided for copying regions that will need to be copied before the writes are actually received, minimising the multiplicative performance impact of the copy-on-write or redirect-on-write actions. Such a task is normally handled by a background copy process, gradually copying the regions sequentially starting at one end of the volume going towards the other.

By intelligently considering the pattern of writes previously seen, the described method predictively copies first the regions most likely to be written to by the host system. This significantly increases the likelihood that, by the time the first write is received for a region after the point-in-time copy is started, the region will have already been copied. The more intelligence that is applied, the lower the impact that triggering a point-in-time copy has on performance, to the point where the impact is negligible.

The described method consists of two parts. A first part consists of a means to record how regularly writes are sent to each area of each volume. The second part uses the data collected by the first part to rank the areas for prioritisation in point-in-time background copy.

Figure 1:
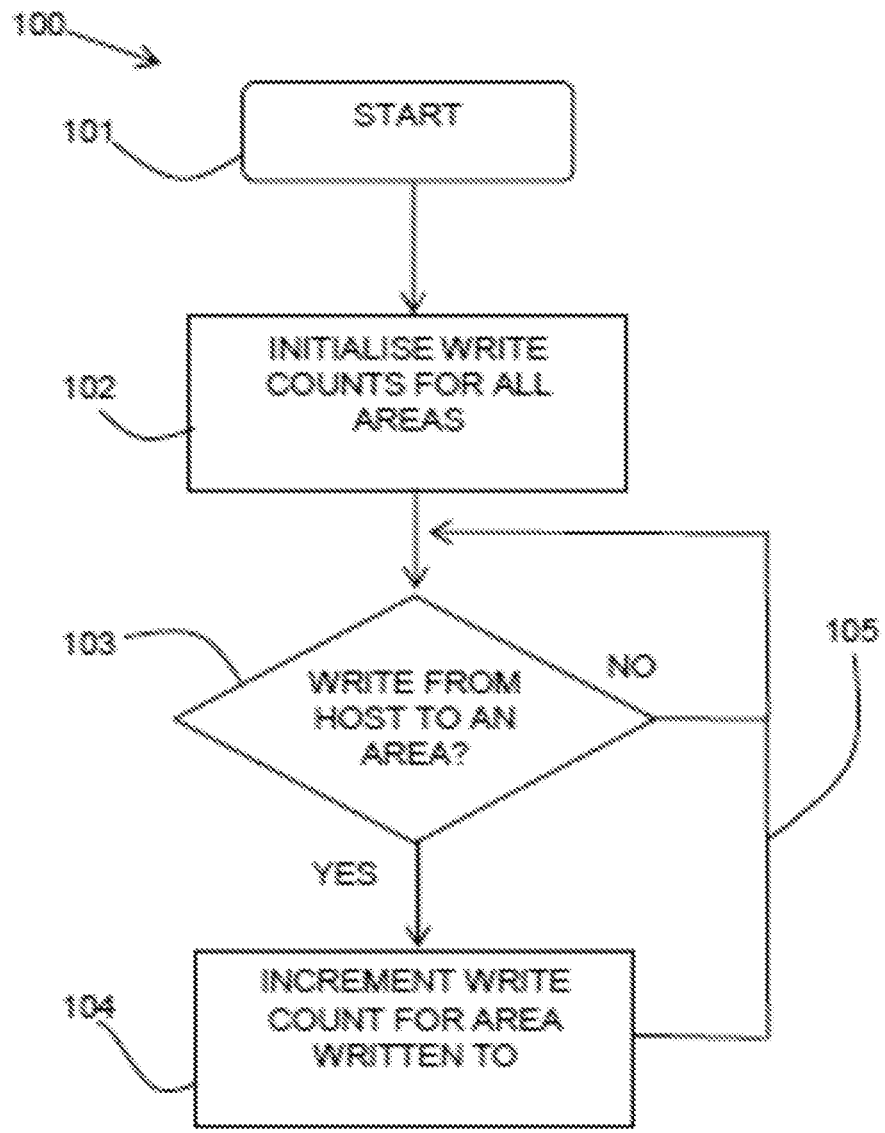
FIG. 1 is a flow diagram of an example embodiment of an aspect of a method in accordance with the present invention.

Referring to FIG. 1, a block diagram 100 shows an example embodiment of the first part of the described method of recording how regularly writes are sent to each area of each volume.

The areas may be the same size as the regions tracked for the point-in-time copy feature, or the areas may be a multiple of the regions' size (most likely to be a power of 2 multiple).

According to the implementation, it may be convenient to have the regions be a small multiple of the storage system's internal read/write size, such that the copy- or redirect-on-write action takes as few disk operations as possible. Sizes are likely to range between 32 kB and 1 MB.

In virtualizing storage controllers, it is best if the areas are the same size as the virtualization granularity. A reason to do this is that the historical record of area access may additionally be used to migrate often-used data to a higher-performing tier of storage. An example of such a feature is IBM System Storage Easy Tier (IBM is a trade mark of International Business Machines Corporation). Sizes are likely to range between 1 MB and 4 TB.

The method starts 101 and write counts for all areas are initialised 102. It is determined 103 if a write from a host is to an area. If so, the write count for the area written to is incremented 104. The method loops 105 to continue to monitor writes and increment the count for each area.

The representation of how regularly writes are submitted may consist of the number of writes submitted to an area in a given period or as a rolling ranking which may give a more balanced response to the write pattern.

In one example, rankings may be generated for a period of 24 hours starting counts from midnight. A historical record may record how many writes were received to the area in the period. Other granularities may be used, according to the pattern of IO. A 24 hour record may represent the general usage of a volume without being susceptible to variation in quantity through a day's IO processing, while rapidly forgetting one-off irregular usage.

Figure 2:
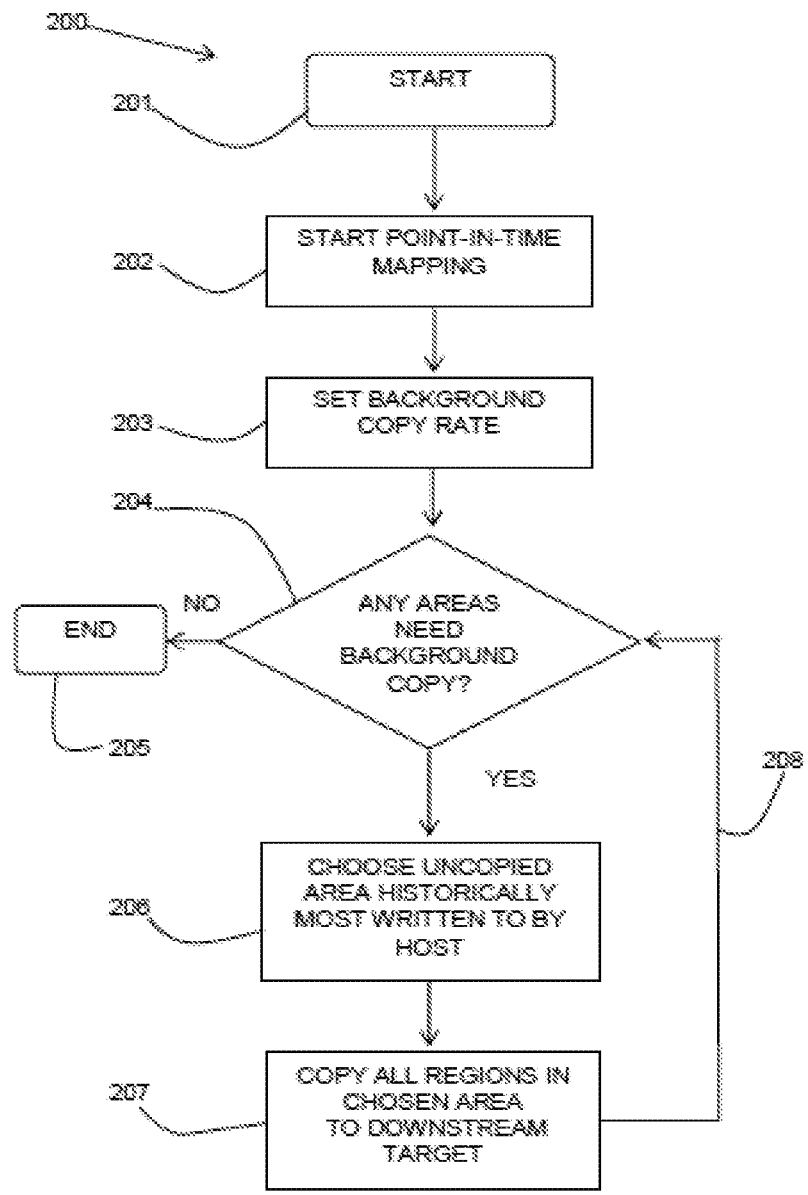
FIG. 2 is a flow diagram of an example embodiment of an aspect of a method in accordance with the present invention.

Referring to FIG. 2, a block diagram 200 shows an example embodiment of the second part of the described method of using collected data to prioritise point-in-time background copy.

The method starts 201 with a start 202 of a point-in-time mapping. A background copy rate may be set 203 as known conventionally. By setting the rate low, the lower the impact the background copy process itself will have on the performance of the volume being copied, but the chance of an area being already copied when written to is lower. The user may choose to set this according to their priorities. Alternatively, a storage system may intelligently vary the background copy rate to increase the rate during periods of fewer writes from host applications.

It is determined 204 if any areas need background copy. If no areas need background copy, the method ends 205. If one or more areas need background copy, the method may choose 206 the uncopied area which is historically the most written to area. All regions in the chosen area may be copied 207 to a downstream target storage.

The method may loop 208 to determine 204 if any further areas need background copy, until no further areas are determined and the method ends 205.

The second part of the described method uses the data collected by the first part, ranked by area write frequency over a given period, to prioritise point-in-time background copy. Thus, when a point-in-time copy is triggered, the background copy process will initially copy the regions most often changed on the disk in the given period, gradually progressing to less-commonly-touched areas of the volume.

With many workloads (particularly database IO workloads), 10% of the volume is accessed 90% of the time, therefore it is only necessary to have copied a small proportion of the volume to make a big difference to the copy-on-write/redirect-on-write overhead.

It may also be that when a point-in-time copy is taken, it signifies the start of a particular kind of data processing. Thus, a further embodiment of the described method may weight the recording of write regularity by time since the last point-in-time copy triggered where that volume was the source.

This further prioritises predictive copying of the areas that are normally written to soon after a point-in-time copy. Many storage systems allow integration with databases such that point-in-time copies are taken between transactions, thus the initial writes after a point-in-time copy is triggered will be those required to start a new transaction.

For example, writes in the first ten seconds could be weighted 20 times higher than normal, from ten to thirty seconds weighted 10 times higher than normal, from thirty to 120 seconds 5 times higher than normal, and so on until at 10 minutes and beyond, writes are weighted normally. Other weightings or time segmentation may be used.

Some implementations do not need to copy all the data every time. For example, incremental point-in-time copy features allows subsequent triggers, after an initial synchronisation copy, to only copy the newly-written-to regions. There will still be enough variation between the regularity of writes to the different regions to make it useful to prioritise the copying as in the described method.

Some implementations allow the target or redirection volume to only occupy as much space as needed to support the changes to the source since the point-in-time copy was triggered. In this environment, background copy is suppressed, and predictive copying such as described here may allocate storage beyond that which is required. In such cases there may be a user-configurable percentage of predictive background copy allowed, for example, the user may allow predictive background copy for 10% of the volume, which is a small quantity but may still remove 90% of the impact of copying.

Partially allocated volumes are usually referred to as "thin-provisioned" volumes, and are used where physical storage space is at a premium. For point-in-time copies they are also used where read/write bandwidth is at a premium and there is no requirement to create a completely independent copy of the data. As it is common to create many point-in-time copies of a volume, limiting the space consumption and the read/write bandwidth requirements of the copies is important.

Thin-provisioned volumes typically consume only as much space as has been written to, subject to the constraints of the thin-provisioning feature, which may enforce a granularity similar to point-in-time regions. Some copy-on-write implementations, such as in IBM SAN Volume Controller, only consume space on a copy for writes received while that copy is the most recent one taken from a volume.

If the storage system predictively copies regions that are likely to be written to, some of those may not actually be written to in the time when the copy needs to be performed—or redirect-on-write, and so we unnecessary storage and read/write bandwidth will have been consumed. The described method allows for limiting this unnecessary usage, for example, by limiting the amount of predictive copying to the areas of the volume that are in the top 10% of historical usage.

Figure 3:
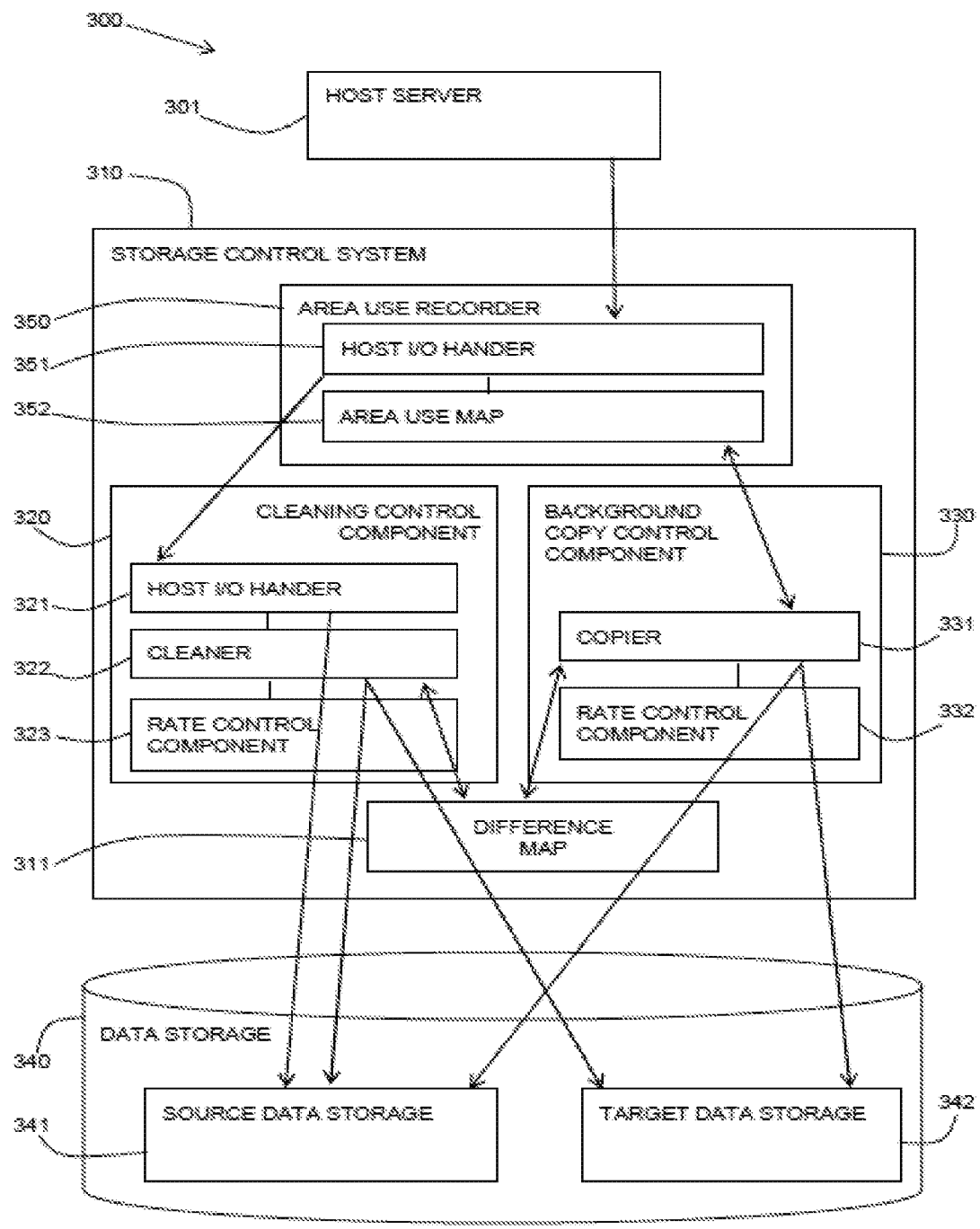
FIG. 3 is a block diagram of an example embodiment of a system in accordance with the present invention.

Referring to FIG. 3, a block diagram shows an example embodiment of the described system 300.

A host server 301 may access data storage 340 via a storage control system 310. A known storage control system 310 may include a cleaning control component 320 and a background copy control component 330.

Cascaded copy-on-write solutions may store only the changes between successive copies of a volume with a copy. Thus if a copy is deleted, it may have changes that a downstream (earlier) copy needs. A cleaning control component 320 may copy that needed data to the first downstream copy that needs it when the first copy is deleted. A control of the rate of cleaning copy may be provided.

The cleaning control component 320 may include a host I/O hander 321 for handling I/O from the host server 301 and forwarding to a source data storage 341 of the data storage 340.

The cleaning control component 320 may also include a cleaner 322 for cleaning source data storage 341 and target data storage 342. The cleaner 322 may update a difference map 311. The cleaning control component 320 may also include a rate control component 323.

The background control component 330 may include a copier 331 which references the difference map 311 and updates source data storage 341 and target data storage 342. The background control component 330 may also include a rate control component 332.

The described system may include an additional component of an area use recorder 350 including a host I/O hander 351 for intercepting host I/O from the host server 301 and forwarding to the host I/O hander 321 of the cleaning control component 320. The interception allows the gathering of data regarding the regions to which writes are being made by the host server 301 in order to generate a volume heat map 352 showing the areas of most writes. Further details of the area use recorder 350 are provided with reference to FIG. 4 below.

Figure 4:
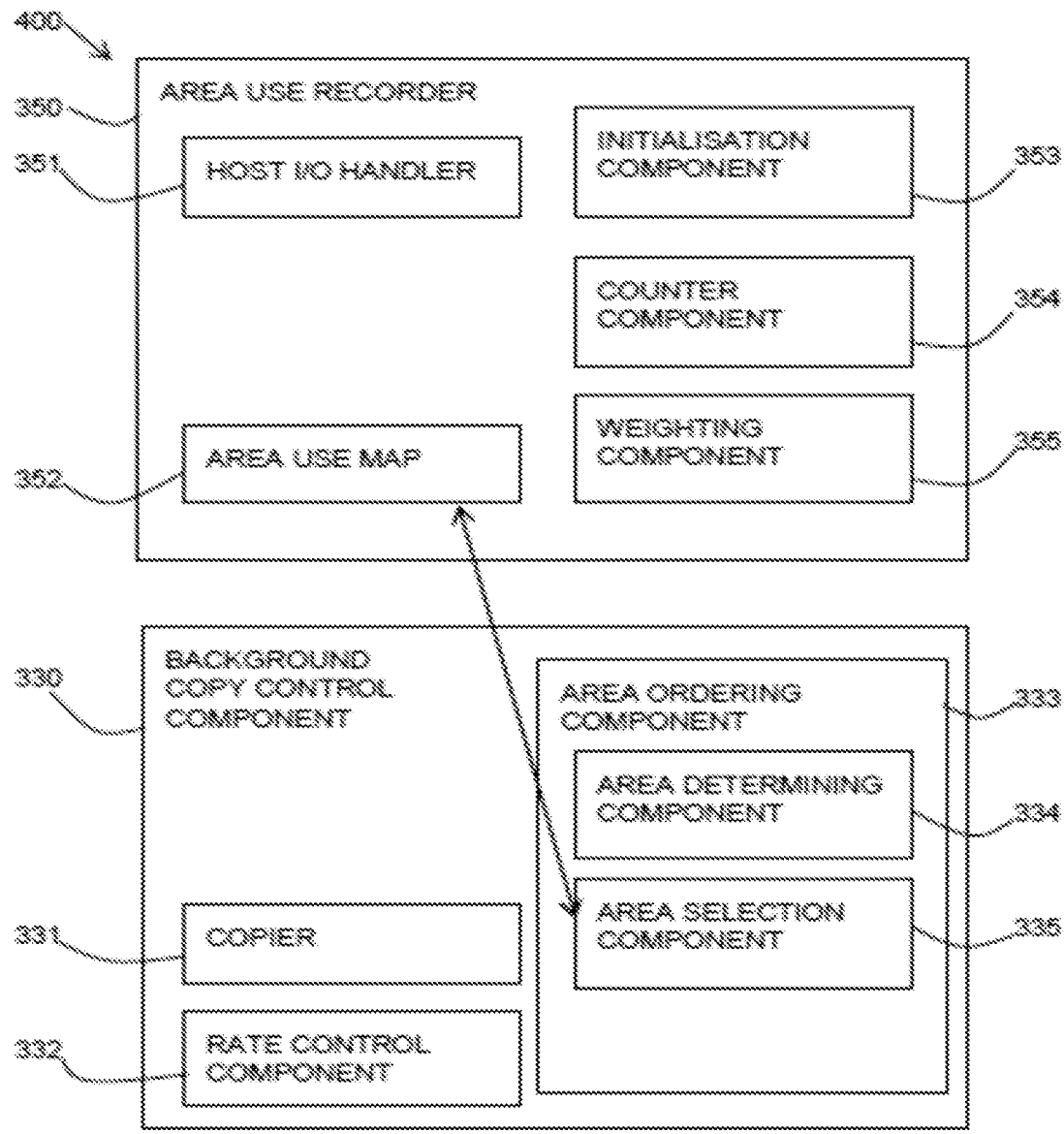
FIG. 4 is a block diagram of an example embodiment of a system in accordance with the present invention.

Referring to FIG. 4, a block diagram 400 shows further details of the area use recorder 350 and background copy control component 330 of FIG. 3.

The area use recorder 350 may include a host I/O hander 351 for intercepting I/O from a host server in order to generate an area use map 352 of areas recording the frequency of writes to areas of a volume.

The area use recorder 350 may also include an initialisation component 353 for initialising write counts for all areas and a counter component 354 for counting writes to each area and forwarding the recorded frequency to the area use map 352. The area use recorder 350 may include a weighting component 355 for weighting writes depending on how close to a previous point-in-time copy they were made.

The background copy control component 330 includes a rate control component 332 and a copier 331. In addition, the background copy control component 330 may include an area ordering component 333 for determining an order in which areas are to be copied. The area ordering component 333 may include an area determining component 334 for determining any areas which need background copy and an area selection component 335 for choosing an uncopied area based on the area use map 352.

Figure 5:
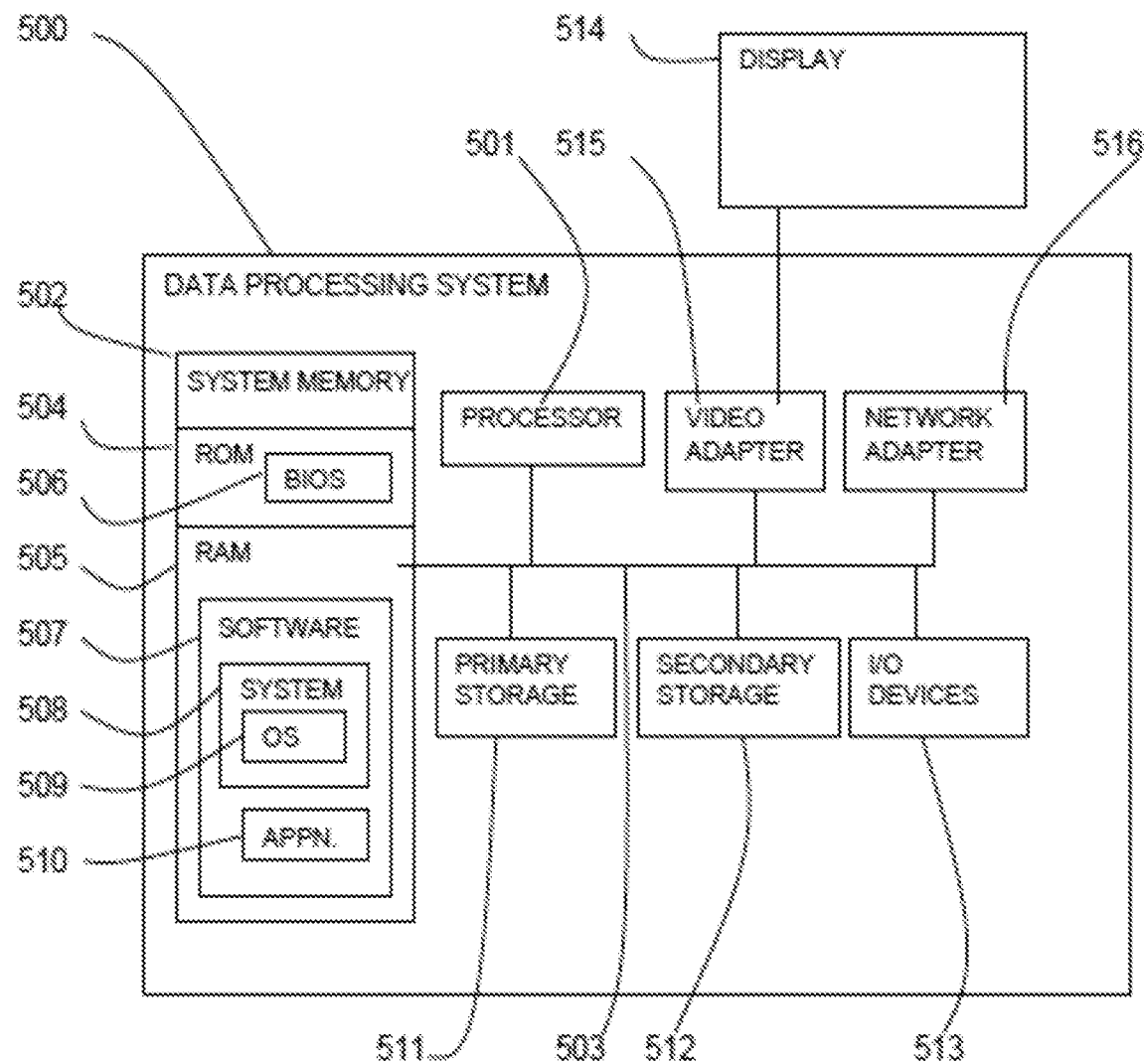
FIG. 5 is a block diagram of an embodiment of a computer system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

Using the described method and system, the storage system may learn how the host applications interact with point-in-time copies, and may optimise the background copy predictively. This in turn means that regions are more likely to be copied by the time the first write to that region takes place following the point-in-time copy being triggered. This in turn reduces the impact of using a point-in-time copy system using copy-on-write or redirect-on write to close to zero. This means that configurations using this described method do not require a doubling of storage devices to support the additional IOs that copy-on-write and redirect-on-write point-in-time copy systems generate. And that results in a potentially massive reduction in storage, space, power, and cooling requirements.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Improvements and modifications can be made to the foregoing without departing from the scope of the present invention.

The invention claimed is:

1. A method for predictive point-in-time copy for storage systems, comprising:
  recording a frequency of writes to an area of a storage volume;
  prioritising areas for having point-in-time copies carried out based on the write frequency to an area, wherein areas in the storage volume having a high write frequency are prioritised before areas with a lower write frequency, wherein an area is of a greater granularity than a region tracked for the point-in-time copy, and wherein an area is of a greater granularity than the region tracked when the area has a size of 2 times n, where n is a size of the region tracked; and
  automatically increasing a point-in-time copy rate during periods of fewer writes from host applications.

2. The method as claimed in claim 1, including:
  recording the frequency of writes to an area in a given period; and
  prioritising areas by their frequency of writes in the given period immediately prior to the point-in-time copy.

3. The method as claimed in claim 1, including:
  recording the frequency of writes to an area as a rolling count of writes; and
  prioritising areas by a rolling ranking of writes at a given time of a point-in-time copy.

4. The method as claimed in claim 1, including:
  running a point-in-time copy when the write rate is below an average write rate.

5. The method as claimed in claim 1, wherein prioritising areas includes:
  determining a time of a previous point-in-time copy for the volume; and
  weighting recordings of writes which occur nearest to the time of the previous point-in-time copy.

6. The method as claimed in claim 5, including:
  defining time segments from the time of the previous point-in-time copy and weighting writes according to the segment in which they take place.

7. The method as claimed in claim 1, including:
  initially synchronising a point-in-time copy for a volume and only copying newly-written regions of a volume in subsequent point-in-time copies; and
  prioritising partial writes to an area.

8. The method as claimed in claim 1, wherein recording a frequency of writes to an area of a storage volume includes:
intercepting input and outputs of a host server.

9. A system for predictive point-in-time copy for storage systems, comprising:
a memory; and
a processor, wherein the processor is configured to perform operations comprising:
recording a frequency of writes to an area of a storage volume;
prioritising areas for having point-in-time copies carried out based on the write frequency to an area, wherein areas in the storage volume having a high write frequency are prioritised before areas with a lower write frequency, wherein an area is of a greater granularity than a region tracked for the point-in-time copy, and wherein an area is of a greater granularity than the region tracked when the area has a size of 2 times n, where n is a size of the region tracked; and
automatically increasing a point-in-time copy rate during periods of fewer writes from host applications.

10. The system as claimed in claim 9, wherein the area use recorder is for:
recording the frequency of writes to an area in a given period; and
prioritising areas by their frequency of writes in the given period immediately prior to the point-in-time copy.

11. The system as claimed in claim 9, wherein the area use recorder is for:
recording the frequency of writes to an area as a rolling count of writes; and
prioritising areas by a rolling ranking of writes at a given time of a point-in-time copy.

12. The system as claimed in claim 9, including:
a background copy control component for running a point-in-time copy when the write rate is below an average write rate.

13. The system as claimed in claim 9, wherein the area ordering component is for:
determining a time of a previous point-in-time copy for the volume; and
weighting recordings of writes which occur nearest to the time of the previous point-in-time copy.

14. The system as claimed in claim 13, wherein the area ordering component is for:
defining time segments from the time of the previous point-in-time copy and weighting writes according to the segment in which they take place.

15. The system as claimed in claim 9, wherein the area use recorder is for:
initially synchronising a point-in-time copy for a volume and only copying newly-written regions of a volume in subsequent point-in-time copies; and
prioritising partial writes to an area.

16. A computer program product for predictive point-in-time copy for storage systems, the computer program product comprising: a non-transitory computer readable storage medium readable by a processing circuit and storing instructions for execution by the processing circuit for performing a method comprising:
recording a frequency of writes to an area of a storage volume;
prioritising areas for having point-in-time copies carried out based on the write frequency to an area, wherein areas in the storage volume having a high write frequency are prioritised before areas with a lower write frequency, wherein an area is of a greater granularity than a region tracked for the point-in-time copy, and wherein an area is of a greater granularity than the region tracked when the area has a size of 2 times n, where n is a size of the region tracked; and
automatically increasing a point-in-time copy rate during periods of fewer writes from host applications.

* * * * *